No. 764,853. Patented July 12, 1904.

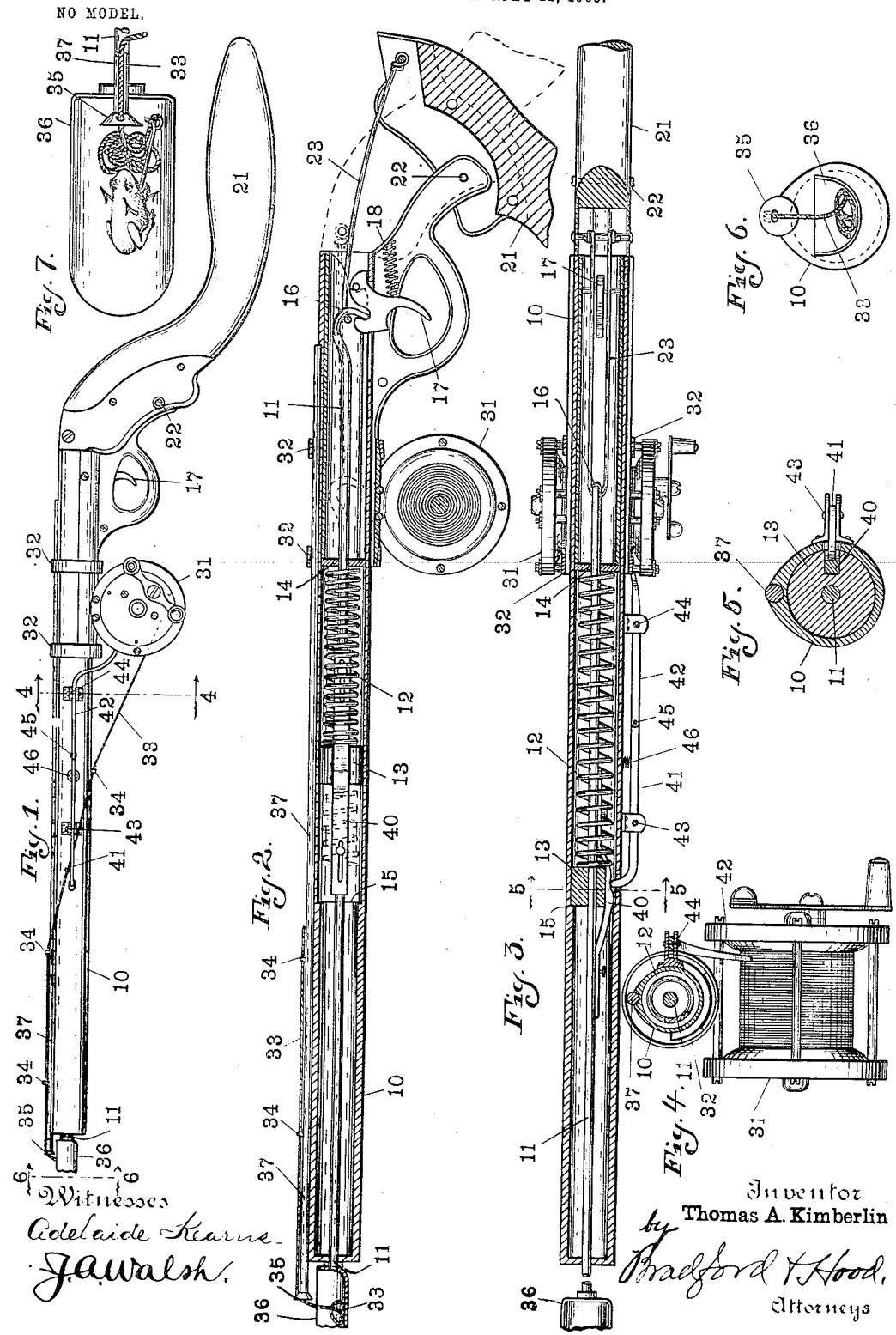

UNITED STATES PATENT OFFICE.

THOMAS A. KIMBERLIN, OF INDIANAPOLIS, INDIANA.

MECHANICAL BAIT-CASTER.

SPECIFICATION forming part of Letters Patent No. 764,853, dated July 12, 1904.

Application filed July 11, 1903. Serial No. 165,054. (No model.)

*To all whom it may concern:*

Be it known that I, THOMAS A. KIMBERLIN, a citizen of the United States, residing at Indianapolis, in the county of Marion and State of Indiana, have invented certain new and useful Improvements in Mechanical Bait-Casters, of which the following is a specification.

The object of my said invention is to produce a mechanical device for anglers' use by means of which flies and other bait may be accurately cast to the point desired.

It consists in a suitable construction of spring-gun upon which the reel carrying the line is mounted and which embodies suitable means for propelling the bait and unreeling the line, all as will be hereinafter more particularly described and claimed.

Referring to the accompanying drawings, which are made a part hereof, and on which similar reference characters indicate similar parts, Figure 1 is a side elevation, with the projector in retracted position, of a bait-caster constructed in accordance with my present invention; Fig. 2, a central vertical sectional view, on a somewhat enlarged scale, through the operative parts thereof; Fig. 3, a horizontal sectional view showing the projecting mechanism in extended position; Fig. 4, a transverse sectional view as seen when looking in the direction indicated by the arrows from the dotted line 4 4 in Fig. 1; Fig. 5, a transverse sectional view as seen when looking in the direction indicated by the arrows from the dotted line 5 5 in Fig. 3; Fig. 6, an end elevation as seen from the dotted line 6 6 alongside Fig. 1; and Fig. 7 a plan view, on a somewhat enlarged scale, of the front portion of the device, showing especially the bait-receptacle and its relation to adjacent parts.

This device is in the general form of a spring-gun. Within the barrel 10 thereof is a reciprocating rod or projector 11, which is actuated by a spring 12, one end of which bears against a collar 13, secured to the rod 11, and the other end of which bears against a bearing-plate 14, secured within the barrel for that purpose. A shoulder 15 is formed in the barrel at the proper point, against which the collar 13 will strike when forced forward by the spring after the latter is released and which limits the travel of said collar. Upon the rear end of the rod 11 is a hook 16, which is adapted to engage with a notch formed for that purpose in the trigger 17. The trigger is held forward into engaging position with the hook on the rod, as shown by the full lines in Fig. 2, by the spring 18. The rod is retracted and its hook brought into engagement with the trigger 17 by means of the handle 21, which is mounted on the pivot 22, and thus acts as a lever, and the link 23, one end of which is connected to said lever-handle and the other of which passes around under the said hook 16. As shown in Fig. 3, this link 23 is double, and the space between the two sides is large enough to permit the point of the hook to travel back and forth. When, therefore, the rod 11 has been retracted, the handle-lever 21 in being thrown back to the position shown in Fig. 1 of the drawings carries this link along with it below the rod to a point just beyond that to which the hook will travel when the gun is discharged, where it remains ready for use when it is desired to again retract said rod.

The line-reel 31 is suitably secured to the barrel 10, usually by means of bands 32, similarly as such reels are commonly secured to fishing-rods. The line 33 runs thence through suitable guides 34 and 35 to in front of the rod 11, which is provided with a bait-holding receptacle 36, which is preferably of an approximately spoon-bowl shape at its front end at the point where the line terminates and the hook carrying the bait is situated. The eyes or guides 34 and 35 are upon a rod 37, mounted on top of the barrel 10 and which serves as the outer portion of the fishing-rod in use and is preferably flexible for the same reason that ordinary fishing-rods are flexible. As will by this time be clearly understood, a pulling upon the trigger when the other parts are in the position illustrated in Fig. 2 will release the rod 11 and permit the spring 12 to throw the same suddenly forward, with the effect that the hook and bait will fly off the bait-receptacle 36 and be projected a considerable distance in the direction in which the implement is pointed. The sudden impulse given by this projecting mechanism starts the reel 31 to revolving with considerable rapidity, so that unless it is checked it will cause the reel to rewind and tangle up the line. In order to guard against this and at the same time not unduly impede the movement, I provide a brake which will be thrown into operation automatically just at the time when the limit of movement of the rod 11 is reached. For this purpose I provide a cam 40, which is secured to the rod 11 and passes through a notch in the side of the collar 13, and upon the outside of the barrel I provide levers 41 and 42, which are pivoted upon supports 43 and 44, respectively. Said levers are connected together at the meeting-point by a pivot 45 and are normally held out into position by a small spring 46, so that the free end of the lever 42 is held away from the line-reel. When, however, the discharge takes place, the cam 40 contacts with the inwardly-extending end of the lever 41, which operates to throw the rear end of the lever 42 lightly against an adjacent surface of the line-reel, thus acting as a brake sufficiently to prevent it from rewinding, while at the same time not appreciably shortening the cast.

As shown in the drawings, the implement is to be held somewhat in the position of a gun or pistol during the time when the cast is being made, and during this time the line-reel is positioned upon the under side, generally just in front of the trigger-guard. After the cast is made, however, I turn the implement over, so that the line-reel is on the upper side, where it is in convenient position for the angler to wind up or otherwise manipulate his line thereby, as may be desired.

Having thus fully described my said invention, what I claim as new, and desire to secure by Letters Patent, is—

1. The combination, in a bait-caster, of a barrel, a rod positioned therein, a bait-holder carried by said rod, a spring adapted to throw said rod outwardly when released, means for retracting said rod and bringing the same into engagement with the trigger, said trigger, a line-reel, a line on said reel, and guides located on the structure between the reel and the bait-holder through which the line passes whereby it is guided in its course from the reel to the bait-holder.

2. The combination, in a bait-caster, of a barrel, projecting means contained within said barrel, means for releasing said projecting means and performing the cast, a line-reel, a line leading from said reel through suitable guides to in front of the projecting means, a brake mounted on the structure adjacent to said reel, and a cam carried by the projecting means arranged to come in contact with and operate said brake to contact with said reel as said projecting means reaches the limit of its movement.

3. The combination, in a bait-caster, of a barrel, a projecting means therein, a cam carried by said projecting means, a compound lever pivoted outside the barrel, the free end of one member of which extends into the path of said cam, and the free end of the other member of which extends to a point adjacent to a surface of the line-reel, and said reel.

4. The combination, in a bait-caster, of a barrel, a projecting means therein, a cam carried by said projecting means, a compound lever pivoted outside the barrel, the free end of one member of which extends into the path of said cam and the free end of the other member of which extends to a point adjacent to a surface of the reel, and means, as a spring, whereby normally the free end of the first-named lever is held in the path of the cam and the free end of the other lever is held away from the surface of the reel so that the braking action on the reel is performed only when the cam reaches and operates upon said first-named lever.

5. The combination, in a bait-caster, of a barrel, a projecting mechanism therein comprising a longitudinal rod having a hook on its end, means for impelling said rod when released, a trigger for holding said rod when retracted, and means for retracting said rod consisting of a lever-like handle and engaging with the hook on the rod, said link having two members as described between which the hook may travel in the discharging operation.

6. The combination, in a bait-caster, of a barrel, projecting mechanism mounted in said barrel, a line-reel mounted on said barrel, a line on said reel the free end whereof extends to adjacent to said projecting mechanism, and means for setting and releasing said projecting mechanism.

In witness whereof I have hereunto set my hand and seal, at Indianapolis, Indiana, this 8th day of July, A. D. 1903.

THOMAS A. KIMBERLIN. [L. S.]

Witnesses:
CHESTER BRADFORD,
JAMES A. WALSH.